(12) United States Patent
Stanford, Jr. et al.

(10) Patent No.: US 7,976,924 B2
(45) Date of Patent: Jul. 12, 2011

(54) ACTIVE GARMENT MATERIALS

(75) Inventors: Thomas B. Stanford, Jr., Oxnard, CA (US); Weldon S. Williamson, Malibu, CA (US); Elena Sherman, Culver City, CA (US); Andrew C. Chu, Cambridge, MA (US)

(73) Assignee: Raytheon Company, Waltham, MA (US)

( * ) Notice: Subject to any disclaimer, the term of this patent is extended or adjusted under 35 U.S.C. 154(b) by 853 days.

(21) Appl. No.: 11/670,965

(22) Filed: Feb. 3, 2007

(65) Prior Publication Data

US 2008/0184468 A1 Aug. 7, 2008

(51) Int. Cl.
*B32B 3/20* (2006.01)
*D03D 15/00* (2006.01)
*A62B 17/00* (2006.01)

(52) U.S. Cl. ............................ 428/92; 442/194; 442/195

(58) Field of Classification Search .................. None
See application file for complete search history.

(56) References Cited

U.S. PATENT DOCUMENTS

| 6,156,842 | A * | 12/2000 | Hoenig et al. ................. 525/171 |
| 6,230,501 | B1 | 5/2001 | Bailey, Sr. et al. ............. 62/51.1 |
| 6,312,784 | B2 | 11/2001 | Russell et al. ................ 428/101 |
| 6,324,703 | B1 | 12/2001 | Chen ................................. 2/458 |
| 2004/0033336 | A1 * | 2/2004 | Schulte .......................... 428/100 |
| 2004/0074062 | A1 * | 4/2004 | Stanford et al. ................ 24/442 |

OTHER PUBLICATIONS

Chan Y. Y. F., Stylios G. K., Engineering the design attributes of woven interior textiles using shape memory polymer, Advanced Flexible Materials and Structures: Engineering with Fibres, The Fibre Society 2003 Spring Symposium, Loughborough, (Jun.-Jul. 2003).*

Qinghao Meng, Jinlian Liu, Liming Shen, Yang Hu, and Jianping Han, A Smart Hollow Filament with Thermal Sensitive Internal Diameter, Journal of Applied Polymer Science, vol. 113, Issue 4, pp. 2440-2449, Aug. 15, 2009.*

Fred Cook, Karl Jacob, Malcolm Polk and Behnam Pourdeyhimi, Shape Memory Polymer Fibers for Comfort Wear, National Textile Center Annual Report, Nov. 2005.*

* cited by examiner

*Primary Examiner* — Jennifer A Chriss
(74) *Attorney, Agent, or Firm* — Baker Botts L.L.P.

(57) ABSTRACT

An adaptable garment material and method of producing such a material. The material may have a substrate and a plurality of shape memory polymer elements integrated therewith, or may be a mat of interwoven shape memory polymer elements. The shape memory elements adapt in the presence of an actuation trigger and exhibit different properties upon actuation.

9 Claims, 3 Drawing Sheets

ACTIVE GARMENT MATERIALS

TECHNICAL FIELD OF THE INVENTION

This invention relates generally to materials used to actively vary the material properties in accordance with one or more environmental factors and, more particularly, to materials involving active adjustment of the material structure to provide varying material properties.

BACKGROUND OF THE INVENTION

Textiles have been used in the manufacture of garments. Materials used to construct the garments have been either natural or man-made. Sometimes, a wearer of a textile garment may become too warm or too cold depending upon a variety of factors. It is possible that these problems may be addressed by some action of the wearer. For example, temperature of a wearer may be adjusted by adding or removing layers of clothing, or by buttoning, unbuttoning, zipping, or unzipping the garment. It is possible that certain portions of the garment may be opened or closed to adjust temperature and insulation of the wearer, as well. For example, side zippers or flaps, or zippers under the sleeves of a jacket or shirt may be opened or closed to modify the temperature of the wearer.

OVERVIEW OF EXAMPLE EMBODIMENTS

A first form of the invention may involve an adaptable garment that may have a substrate and a plurality of shape memory polymer elements integrated therewith. It may also include one or more sensors configured to sense a change in one or more environmental factors and a processor operable to apply an electrical potential to one or more of the shape memory polymer elements. The application of the electrical potential may alter the properties of the shape memory polymer elements in response to a sensed change in the one or more environmental factors.

A second form of the invention may involve an adaptable textile material that may include a substrate and a plurality of shape memory polymer elements integrated with the substrate. The shape memory polymer elements may adapt from a first state to a second state in the presence of an actuation trigger. In one such embodiment, the plurality of shape memory polymer elements may be adapted to exhibit different material properties, such as a change in insulation or wicking capability, for example, between the first state and the second state.

A third form of the invention may involve a method for producing an adaptable textile material which may exhibit variable material properties. In one such embodiment, one may attach or interweave a plurality of shape memory polymer fibers to a substrate. The shape memory polymer fibers may be heated above a shape change transition temperature of the shape memory polymer. Pressure may be applied to the shape memory alloy fibers to form the fibers into a first state. The shape memory polymer fibers may be cooled below the shape change transition temperature of the shape memory polymer.

A technical advantage of one embodiment of the present invention is that a garment may be configured to adjust its insulative properties to provide a varying degree of insulating or cooling of either a portion or all of a wearer based upon the environmental factors and activity level of the wearer. Another technical advantage of one embodiment of the present invention is that the variable insulative functions of the material or garment may be configured to operate without intervention from the wearer.

Yet another technical advantage of one embodiment of the present invention is the ability to quickly change the properties of a garment, either automatically or in response to a wearer's input. Still another technical advantage of one embodiment of the present invention is the ability to automatically sense a dangerous or undesirable environmental factor, such as the presence or absence of a chemical element or some combination thereof, and to modify the structure of the material to selectively increase, reduce, or eliminate transmission through the material or garment.

While specific advantages have been enumerated above, various embodiments may include all, some, or none of the enumerated advantages. Other technical advantages of the present invention will be readily apparent to one skilled in the art from the following figures, descriptions, and claims.

BRIEF DESCRIPTION OF THE DRAWINGS

A better understanding of the present invention will be realized from the detailed description which follows, taken in conjunction with the accompanying drawings, in which.

DETAILED DESCRIPTION OF EXAMPLE EMBODIMENTS

There are a variety of applications in which there exists a need to control exposure to one or more environmental factors, such as temperature, humidity or precipitation, perspiration of the wearer, or the presence or absence of one or more chemical agents. One example is that of a person who may need to wear a garment that adapts to adverse weather or environmental conditions, including heat, humidity, or precipitation.

In some instances, for example, the wearer may be engaged in an activity wherein a significant amount of heat is generated, e.g., running, carrying heavy loads, or participating in a sporting event, and physical duress due to heat may be an issue. A significant amount of generated heat may be given off by one or more portions a wearer's body, and one or more garments having cooling properties may be desirable to increase the rate of heat transfer from the wearer to the environment.

In other instances, for example, the wearer may be exposed to an environment that includes one or more chemical agents. It may be desirable to limit exposure by having a garment that adapts to reduce its porosity and, thereby, reduce the amount of chemical agent that comes into contact with the wearer.

Figure 1A:
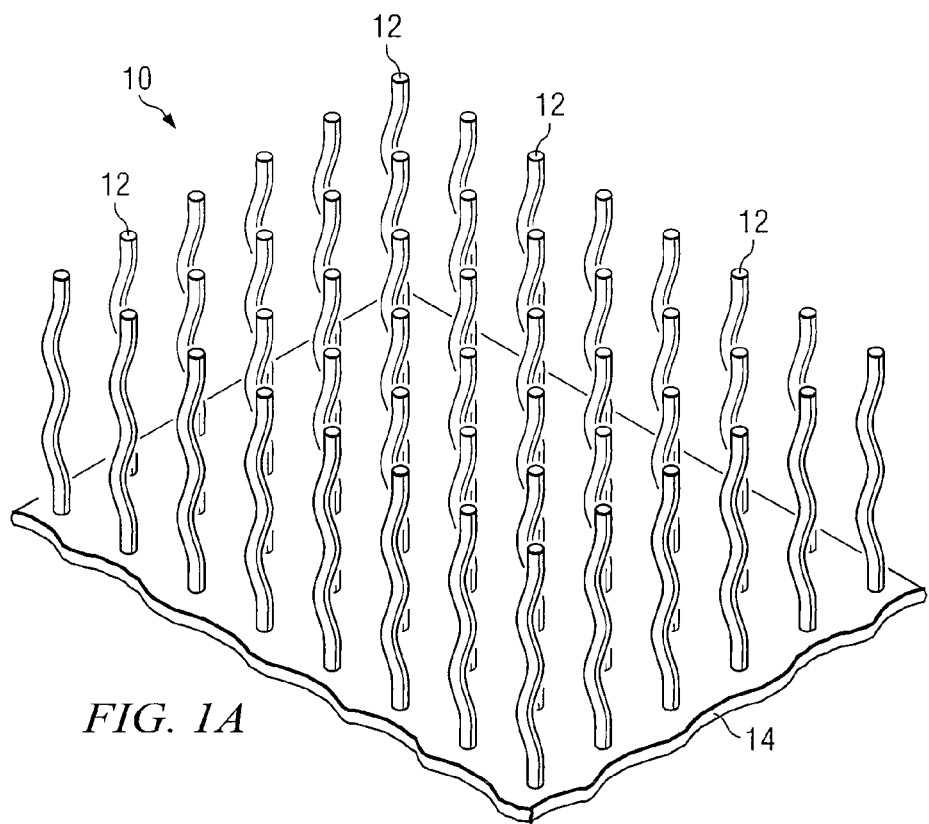
FIG. 1A depicts an isometric view of an embodiment of a material incorporating a substrate and a plurality of shape memory polymer fibers in a first state.
Figure 1B:
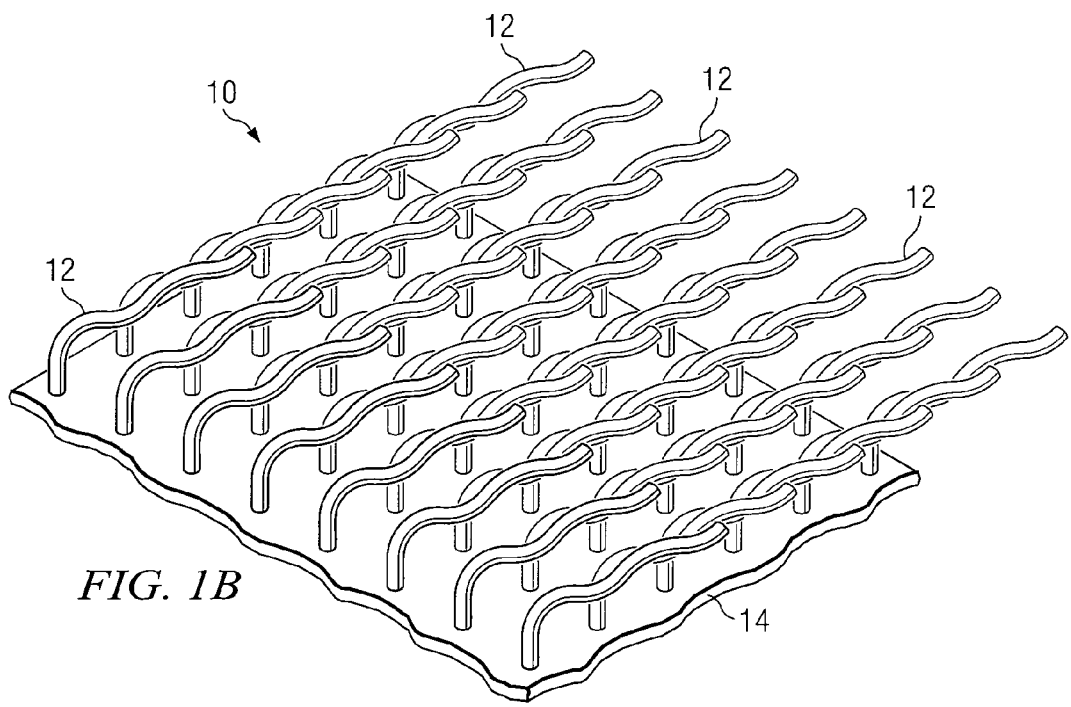
FIG. 1B depicts an isometric view of another embodiment of a material incorporating a substrate and a plurality of shape memory polymer fibers in a second state.

Referring to FIGS. 1A and 1B, a first embodiment of material 10 is depicted as including a plurality of shape memory polymer fibers 12 which are integrated with a substrate 14. Some examples of polymers which may be used for this application include thermoplastics, such as polyurethanes, polyvinylchlorides, urethane/butadiene co-polymers, polyethers, and polyesters to name a few.

Fibers 12 and substrate 14 may be integrated by any known means of incorporation. For example, fibers 12 may be interwoven into substrate 14, or may be attached with an adhesive or other material or by fusing fibers 12 with substrate 14. The plurality of fibers 12 are depicted in FIG. 1A in a substantially uncompressed state, while the plurality of fibers 12 are depicted in FIG. 1B in a substantially compressed state. The depictions of FIGS. 1A and 1B may represent either an inactive state and an activated state of material 10, or an activated state and an inactive state of material 10, respectively.

It should be noted that the term "substrate" is used herein to differentiate that portion of the material from the active portion of the shape memory polymer elements. The term substrate should not be construed to identify any required location of that portion of the material within a garment made from the material. For example, in one embodiment the substrate may be the innermost layer of a garment. In another embodiment, the substrate may be the outermost layer of a garment, e.g., a shell of a coat, pants, hat or hood, gloves, etc. In yet another embodiment, the substrate may be an intermediary layer within a garment. In still another embodiment, the substrate may be comprised of one or more fibers onto which the shape memory polymer is coated or bonded, wherein the shape memory polymer would comprise the active portion of the material.

Although the plurality of fibers 12 are depicted in a substantially uncompressed or substantially compressed state in FIGS. 1A and 1B, respectively, all of the plurality of fibers 12 need not exist in the same state at the same time. For example, one or more fibers in the embodiment depicted in FIG. 1A may be in an compressed state and still fall within the spirit and scope of the present invention. Similarly, one or more fibers in the embodiment depicted in FIG. 1B may be in an uncompressed state and still fall within the spirit and scope of the present invention.

The substantially uncompressed and substantially compressed states depicted in FIGS. 1A and 1B, respectively, may correspond to an first state and second state of the shape memory polymer fibers. However, either the compressed or uncompressed state may correspond to the active state of the shape memory polymer elements. In one embodiment, fibers 12 may exhibit the uncompressed state when activated. In another embodiment, fibers 12 may exhibit the compressed state when activated. In yet another embodiment, the fibers may be a combination of a natural or synthetic material with a shape memory polymer coating bonded or applied thereto, wherein the activation of the shape memory polymer coating may alter the shape of the fibers. The active and inactive state characteristics of a given embodiment may be implemented as discussed below.

A variety of actuation triggers or methods may be used to initiate or control the shape memory polymer elements. Such methods or triggers may include, but are not limited to, exposure to an ambient temperature, the use of applied electric potentials, chemical reactions, and the like.

In one embodiment, the ambient temperature near the material may activate the shape memory polymer elements. For example, if the ambient temperature around the material increases above a certain temperature, the shape memory polymer elements may be actuated and may alter the properties of the material, for example, by increasing the porosity of the material or by reducing an amount of captured air within the material which may reduce its insulative effect. Such an embodiment may utilize, but does not require, one or more additional actuation triggers. For example, an embodiment may be triggered by the air temperature or wearer's body temperature, and may also incorporate a circuit that applies an electric potential to the shape memory polymer elements.

In an embodiment using an applied electric potential to trigger a phase change in the shape memory polymer elements, the shape memory polymer elements may be activated by a circuit (not shown) comprising a power source, e.g., a battery, in electrical and/or thermal communication with the active shape memory polymer elements. Electrical and/or thermal communication between the power source and shape memory polymer elements may be by any known method, e.g., conductors interwoven through the garment or garment material, resistive heating elements, etc. In one such embodiment, automatic regulation of the state of the shape memory polymer elements may be governed by a suitable circuit comprising temperature sensors and a thermostat. In another embodiment, the shape memory polymer elements may be activated manually, e.g., by a switch. In yet another embodiment, the voltage applied to the shape memory polymer elements may be varied by a suitable component, e.g., using a potentiometer, rheostat, or thermistor.

Although embodiments of the present invention have been described as having shape memory polymer elements that exhibit an active and an inactive state, the material may be designed in such a way as to allow bi-directional state changes through activation of discrete portions of the material. In one such embodiment, two separate layers of shape memory polymer material may be bonded together, or to a third layer, and may allow for bi-directional state changes. In such an embodiment, the state change of one layer of shape memory polymer elements may impart a strain to another layer of shape memory polymer elements. In another example embodiment, the shape memory polymer elements may exhibit more than two phase change states.

Figure 1C:
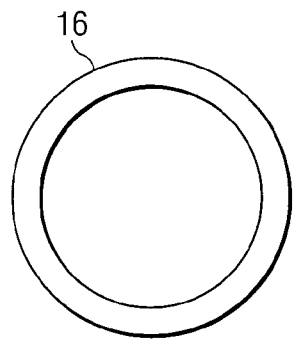
FIG. 1C depicts a cross-sectional view of another embodiment of the filaments depicted in FIGS. 1A and 1B in an activated or inactive state.
Figure 1D:
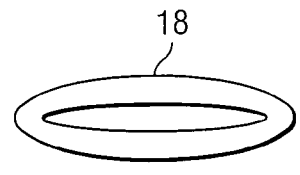
FIG. 1D depicts a cross-sectional view of another embodiment of the filaments depicted in FIGS. 1A and 1B in an inactive or activated state.

While the shape memory polymer fibers 12 may be solid filaments, shape memory polymer fibers 12 may also be defined by different cross-sectional shapes. In addition, the cross-sectional shape may change between the first and second states. One example is depicted in FIGS. 1C and 1D. In one such embodiment, an activated shape may be a hollow tubular fiber 16 and an inactive shape may be a compressed or flattened tubular fiber 18. Additionally, a hollow tubular fiber 16, as described above, may be bent as depicted in FIG. 1B, for example.

Various combinations may be employed, such as one or more hollow tubular fibers 16 that may be bent so as to be substantially parallel to the plane of the substrate 14 in an inactive state, which transition into one or more flattened tubular fibers 18 that may be substantially perpendicular to the plane of the substrate 14 in an activated state. In an inactive state, such an embodiment may provide increased insulation from the air cavity inside one or more of the tubular fibers 16 and the air entrapped within one or more of airspaces created by the bending of one or more of the tubular fibers 16 toward a form resembling that of fibers 12 depicted in FIG. 1B. In an activated state, decreased insulation may result from the flattening of one or more flattened tubular fibers 18 and the unbending of one or more of flattened tubular fibers 18 toward a form resembling that of fibers 12 depicted in FIG. 1A.

Thus, according to the above-described embodiments of the invention, a material 10 is provided that may be quickly adapted in response to one or more environmental factors or upon some action of the wearer to provide an appropriate level of some desired characteristic, e.g., cooling, insulation, wicking, porosity, etc., based upon one or more current operating conditions, e.g., temperature, humidity, exposure to one or more chemicals, or environmental factors based upon the physical activity of the wearer.

Although the embodiments depicted in FIGS. 1A and 1B represent the shape memory polymer fibers 12 as relatively untangled, embodiments of the invention may involve a more tangled form of the shape memory polymer fibers 12. For example, the shape memory polymer fibers 12 may resemble a fiber batting, e.g., a synthetic fleece such as that manufactured under the trademark Polartec™. The structural change in such embodiments may comprise the expanding and contracting of the air spaces within the shape memory fiber batting, rather than the substantially extended and substantially flattened forms of the shape memory polymer fibers 12 depicted in FIGS. 1A and 1B, respectively. Such embodiments may also incorporate fibers of different cross-sectional shapes, e.g., the hollow tubular fibers 16 and 18 described above and depicted in FIGS. 1C and 1D. In such an embodiment, the shape memory polymer fibers may expand upon actuation into a second state. In one such embodiment, mechanical compression may return the shape memory polymer fibers back to the first state.

Figure 2A:
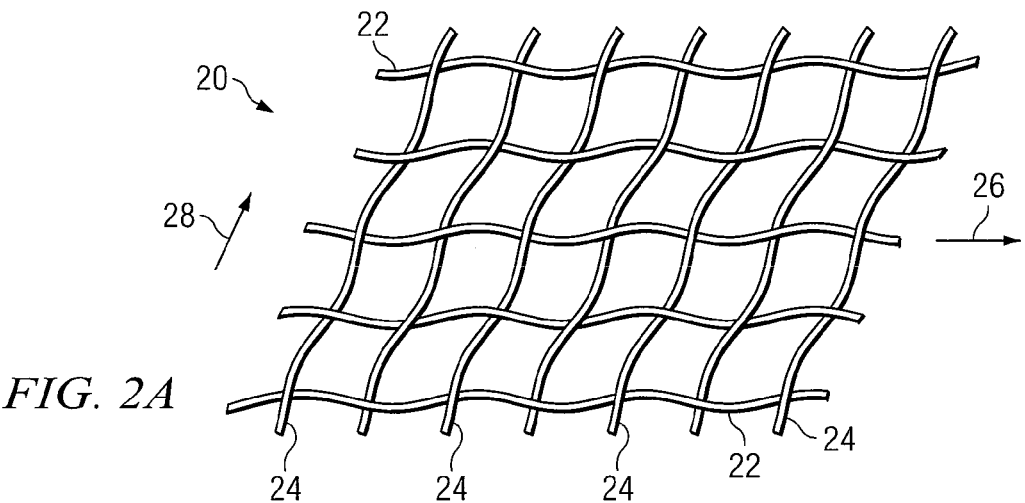
FIG. 2A depicts an isometric view of another embodiment of a material incorporating a plurality of interwoven shape memory polymer fibers in a first state.

Referring now to FIG. 2A, material 20 is depicted as including a plurality of shape memory polymer elements interwoven to form an active garment material. A first plurality of shape memory polymer filaments 22 extend substantially in a first direction 26. A second plurality of shape memory polymer filaments 24 extend substantially in a second direction 28, which direction is substantially perpendicular to direction 26. Although the material depicted in FIG. 2A appears to be substantially co-planar, it need not be so in all embodiments.

Figure 2B:
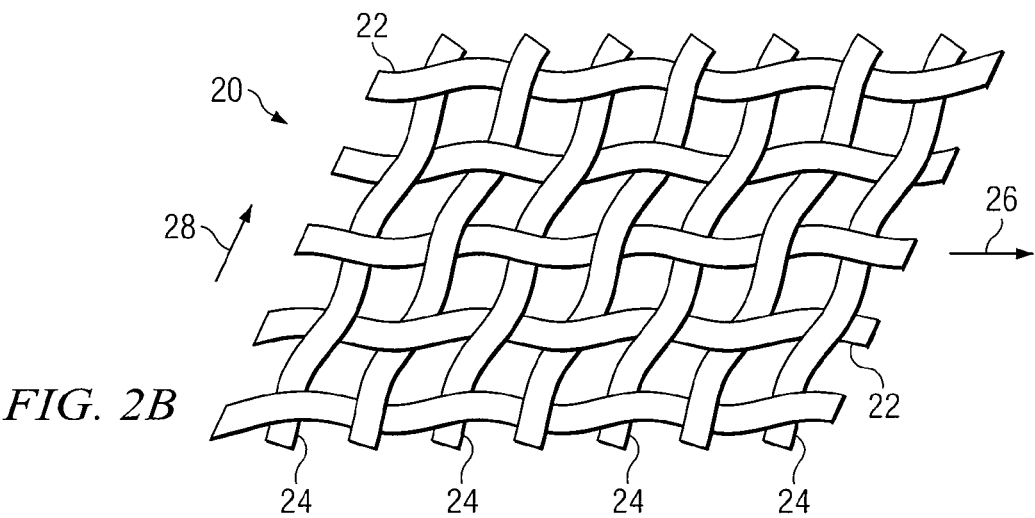
FIG. 2B depicts an isometric view of another embodiment of a material incorporating a plurality of interwoven shape memory polymer fibers in a second state.

The embodiment depicted in FIG. 2A may represent material 20 in an inactivate state, while that depicted in FIG. 2B may represent material 20 in an activated state. In such an embodiment, the activation of material 20 may affect one or more material properties of material 20, such as the porosity, wicking effects, insulative properties, etc.

In one example of an embodiment of material 20 as described above, activation of the shape memory polymer filaments 24 and 26 may increase the thermal insulation characteristics of material 20. For example, the volume of one or more of shape memory polymer filaments 24 and 26 may increase upon activation to reduce the size of the pores of the material. In such an embodiment, activation of shape memory polymer filaments 24 and 26 may reduce or eliminate the ability for chemical agents to permeate the material. Such an embodiment may also increase the insulative effect of material 20 or may increase wicking of perspiration due to capillary action.

Activation of material 20 may be through an activation trigger, e.g., a change in temperature of the material, or the influence of an applied electric potential. For example, a battery-powered circuit (not shown) may be activated, either manually by a wearer engaging the circuit or through automatic means in response to a sensed condition, to heat one or more of the shape memory polymer filaments 24 and 26 and may provide a combined heating effect on the wearer and/or an increased insulative effect of the material 20.

In another embodiment of material 20, the activated state of material 20 may resemble that shown in FIG. 2A. In this embodiment, activation may reduce the volume of filaments 24 and 26 and may, in turn, enlarge the size of the pores of the material. Such an embodiment may be activated by a wearer's body temperature, in response to a chemical reaction, by an applied electric potential, or a combination of one or more activation triggers. Such an embodiment may reduce wicking of moisture or perspiration from portions of a wearer's body, or may allow ambient air to pass through material 20 to effect convective and/or evaporative cooling of portions of a wearer's body. The properties of material 20 may be designed according to one or more anticipated environmental conditions relating to the wearer or to the environment in which the material may be expected to be utilized.

In one embodiment depicted in FIGS. 2A and 2B, one or more of filaments 24 and 26 may be comprised of a natural or synthetic fiber which is coated with a shape memory polymer material, or has a shape memory polymer material bonded to it. Activation of the shape memory polymer in such an embodiment may alter the properties of the natural or synthetic fibers.

In yet another embodiment depicted in FIGS. 2A and 2B, an auxiliary layer of material may be bonded to the shape memory polymer layer. Such an auxiliary layer may be bonded to the inside or outside of the shape memory polymer layer, or may be bonded between two shape memory polymer layers. Such an auxiliary layer may be comprised of natural materials (e.g., cotton, wool), synthetic materials (e.g., nylon, dacron, kevlar), or may be comprised of shape memory polymer elements, such as those described herein.

Figure 3A:
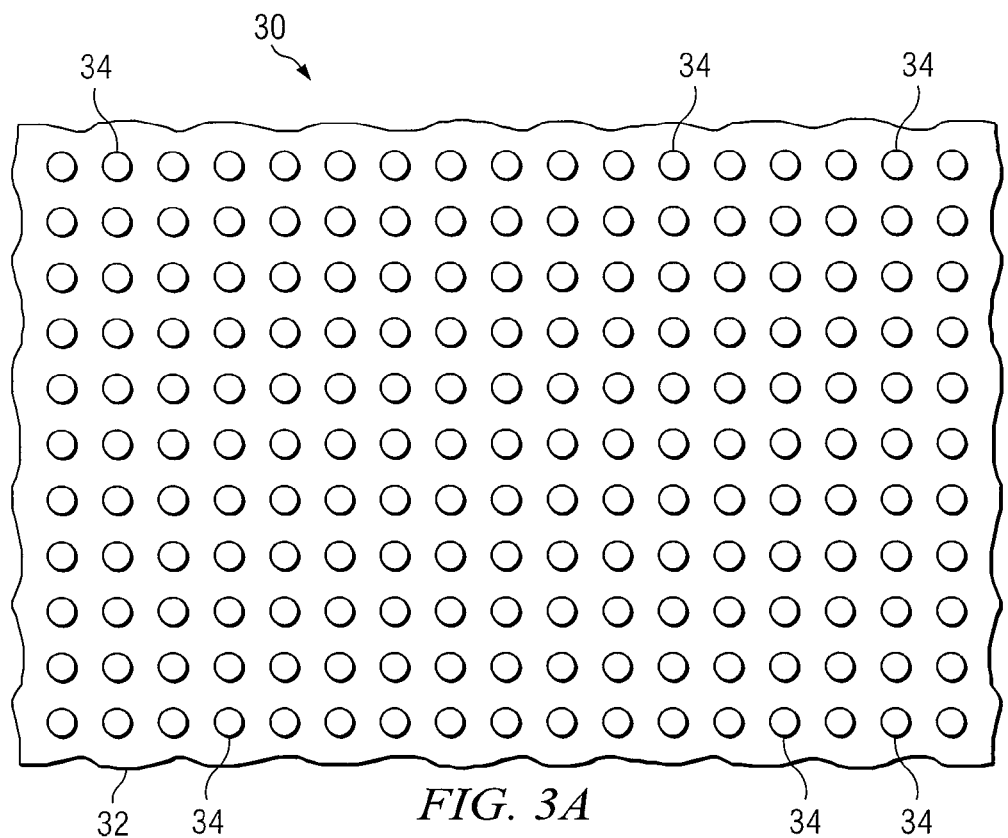
FIG. 3A depicts a cross-sectional view of another embodiment of a material incorporating a substrate and a plurality of shape memory polymer elements in a first state, wherein the shape memory polymer elements may exhibit a tubular or spherical form.

Referring now to FIG. 3A, yet another embodiment is depicted. Material 30 includes a substrate 32 and a plurality of shape memory polymer elements 34. In such an embodiment, shape memory elements 34 may undergo a volumetric change upon activation. Although the shape memory polymer elements 34 are depicted as tubular elements, they may be any shape that is suitable for use in an anticipated environment. For example, shape memory polymer elements 34 may be formed as spherical elements embedded in substrate 32. Moreover, substrate 32 and shape memory polymer elements 34 may be made of a similar or the same material, wherein the shape memory polymer elements 34 may have been modified to exhibit the shape memory effect. In certain embodiments, substrate 32 may exist simply as the interface of shape memory polymer elements 34 that are joined or fused to form material 30.

Figure 3B:
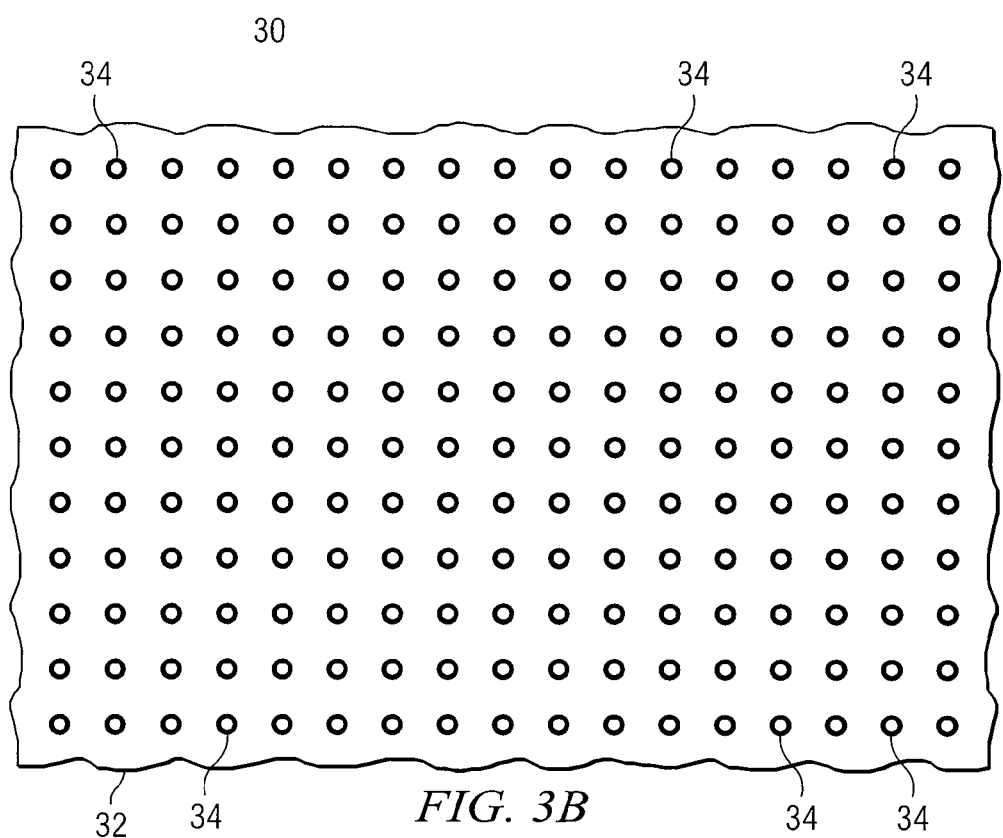
FIG. 3B depicts a cross-sectional view of another embodiment of a material incorporating a substrate and a plurality of shape memory polymer elements in a second state, wherein the shape memory polymer elements form a foam wherein the shape memory polymer elements are depicted in, for example, a tubular or spherical form.

In one embodiment, as depicted in FIG. 3A, material 30 may be in an inactivated state, while in the embodiment depicted in FIG. 3B the material 30 may in an activated state. In another embodiment, material 30 depicted in FIG. 3A may represent the activated state and FIG. 3B may represent the inactivated state. In any of these embodiments, the activation of material 30 may affect one or more material properties of material 30, such as the porosity, wicking effects, insulative properties, etc.

In another embodiment, material 30 may be comprised of a shape memory polymer in an irregular pattern, such as a blown foam. In such an embodiment, the shape memory effect may again cause a volumetric change in material 30. For example, in one such embodiment material 30 may exist in an inactivated state as a compressed foam material and may be subjected to an activation trigger, e.g., a temperature change by energizing an electrical circuit (not shown) that may include resistive heating elements, wherein the foam of material 30 expands to incorporate larger air pockets which may increase the insulative effect of material 30. In an embodiment such as this, an auxiliary material layer may be bonded to the shape memory polymer layer. The auxiliary material layer may be the innermost or outermost layer, or may be bonded between layers of shape memory polymer.

The method for making the active materials described herein generally involves imparting one or more remembered shapes to the shape memory polymer elements and combining them with or into the material. However, the shape memory polymer elements may be combined with the substrate prior to imparting the one or more remembered shapes, or the substrate may be formed by integration of the shape memory elements into the material.

The active material 10, as shown in FIGS. 1A and 1B, may be made by attaching the shape memory polymer fibers 12 to substrate 14, heating the fibers 12 above a shape transition temperature $T_g$, applying mechanical force to provide a strain upon fibers 12 to create a remembered shape, and cooling the fibers 12 below shape transition temperature $T_g$. Application of mechanical force may also be used to texturize fibers 12. For example, the fibers 12 may be texturized by mechanical crimping or forming processes, such as described in Textile Fibers, Dyes, Finishes, and Processes: A Concise Guide by Howard L. Needles, Noyes Publications, 1986, which is herein incorporated by reference.

While the process detailed above describes integrating the fibers 12 to substrate 14 prior to imparting a remembered shape, the integration of fibers 12 may be performed independently from the heating, compressing, and cooling thereof. For example, it may be desirable to impart one or more remembered shapes to the fibers 12 prior to integrating them with the substrate 14.

Material 20 depicted in FIGS. 2A and 2B may be made by imparting one or more remembered shapes to one or more of filaments 24 and 26, in the same or a similar manner to that described above, and interweaving them to form active material 20. Again, imparting the one or more remembered shapes to filaments 24 and 26 may be performed either before or after interweaving them into material 20.

Material 30 depicted in FIGS. 3A and 3B may be made by imparting one or more remembered shapes to shape memory polymer elements 34 and combining them with substrate 32. The form of shape memory polymer elements 34 may be spherical, tubular, or some other suitable shape, as described above. In certain embodiments, material 30 may be formed by attaching or fusing the shape memory polymer elements 34 together, e.g., during heating while imparting a remembered shape. In other embodiments, material 30 may be formed as a blown foam. In such embodiments, the substrate 32 may be defined by the attached or fused regions.

Although selected embodiments have been illustrated and described in detail, it will be understood that various substitutions and alterations are possible without departing from the spirit and scope of the present invention, as defined by the following claims.

What is claimed is:

1. An adaptable garment material comprising:
   a substrate;
   a plurality of shape memory polymer elements integrated with the substrate, the plurality of shape memory polymer elements including a first shape memory polymer element having a cross-sectional shape that adapts from a first state to a second state in response to a first actuation trigger, wherein:
   the first shape memory polymer element comprises a closed hollow interior portion;
   the closed hollow interior portion has a first volume when the cross-sectional shape is in the first state; and
   the closed hollow interior portion has a second volume when the cross-sectional shape is in the second state, the second volume being different than the first volume.

2. The adaptable garment material of claim 1, wherein the material exhibits different insulative and wicking properties when the first shape memory polymer element is in the first state and than when the first shape memory polymer element is in the second state.

3. The adaptable garment material of claim 1, wherein the plurality of shape memory polymer elements include a second shape memory polymer element that adapts from a third state to a fourth state in the presence of a second actuation trigger, at least a portion the second shape memory polymer element being substantially parallel to the substrate in the third state and substantially perpendicular to the substrate in the fourth state.

4. The adaptable garment material of claim 3, wherein the third state corresponds to a compressed state of said second shape memory polymer element and the fourth state corresponds to an expanded state of said second shape memory polymer element.

5. The adaptable garment material of claim 3, wherein said first actuation trigger and said second actuation trigger comprise the same actuation trigger.

6. The adaptable garment material of claim 3, wherein the first shape memory polymer element and the second shape memory polymer element are the same.

7. The adaptable garment material of claim 1 wherein the first actuation trigger comprises an increase in temperature above a shape memory transition temperature.

8. The adaptable garment material of claim 1 wherein the first actuation trigger comprises a change in electrical potential applied to the first shape memory polymer element.

9. The adaptable garment material of claim 1, wherein the first actuation trigger comprises the presence of one or more chemical agents.

* * * * *